(12) United States Patent
Desai et al.

(10) Patent No.: US 9,030,501 B2
(45) Date of Patent: *May 12, 2015

(54) METHODS AND SYSTEMS FOR MODIFYING A DISPLAY OF A FIELD OF VIEW OF A ROBOTIC DEVICE TO INCLUDE ZOOMED-IN AND ZOOMED-OUT VIEWS

(71) Applicant: Google Inc., Mountain View, CA (US)

(72) Inventors: Munjal Desai, Mountain View, CA (US); Ryan Hickman, Mountain View, CA (US); Thor Lewis, Mountain View, CA (US); Damon Kohler, Mountain View, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/459,437

(22) Filed: Aug. 14, 2014

(65) Prior Publication Data

US 2014/0362121 A1    Dec. 11, 2014

Related U.S. Application Data

(63) Continuation of application No. 13/213,648, filed on Aug. 19, 2011, now Pat. No. 8,836,730.

(51) Int. Cl.
*G09G 5/00* (2006.01)
*G06T 3/00* (2006.01)
*G01C 3/08* (2006.01)

(52) U.S. Cl.
CPC ................ *G06T 3/0006* (2013.01); *G09G 5/00* (2013.01); *G01C 3/08* (2013.01); *G06T 2211/428* (2013.01); *Y10S 901/01* (2013.01)

(58) Field of Classification Search
None
See application file for complete search history.

(56) References Cited

U.S. PATENT DOCUMENTS

| | | | |
|---|---|---|---|
| 7,466,359 B2 * | 12/2008 | Enomoto et al. | 348/370 |
| 7,508,374 B2 | 3/2009 | Tsunoda | |
| 2005/0071046 A1 * | 3/2005 | Miyazaki et al. | 700/245 |
| 2009/0207282 A1 * | 8/2009 | Sasaki et al. | 348/240.3 |
| 2010/0283837 A1 * | 11/2010 | Oohchida et al. | 348/47 |
| 2012/0044263 A1 | 2/2012 | Kim et al. | |
| 2012/0283837 A1 | 11/2012 | Bae et al. | |
| 2012/0327315 A1 | 12/2012 | Larsen et al. | |

* cited by examiner

*Primary Examiner* — Kee M Tung
*Assistant Examiner* — Frank Chen
(74) *Attorney, Agent, or Firm* — McDonnell Boehnen Hulbert & Berghoff LLP

(57) ABSTRACT

Methods and systems for modifying a display of a field of view of a robotic device to include zoomed-in and zoomed-out views are provided. In examples, the robotic device may include a camera to capture images in a field of view of a robotic device, and distance sensors which can provide outputs that may be used to determine a distance of the robotic device to an object in the field of view of the robotic device. A display of the field of view of the robotic device can be generated, and as the distance decreases, the display can be modified to include a zoomed-in view of the object. As the distance increases, the display can be modified to include a zoomed-out view of the object. An amount of zoom of the object may be inversely proportional to the distance.

20 Claims, 6 Drawing Sheets

METHODS AND SYSTEMS FOR MODIFYING A DISPLAY OF A FIELD OF VIEW OF A ROBOTIC DEVICE TO INCLUDE ZOOMED-IN AND ZOOMED-OUT VIEWS

CROSS REFERENCE TO RELATED APPLICATION

The present application is a continuation of U.S. patent application Ser. No. 13/213,648, filed on Aug. 19, 2011, and entitled "Methods and Systems for Modifying a Display of a Field of View of a Robotic Device to include Zoomed-in and Zoomed-out Views," which is herein incorporated by reference as if fully set forth in this description.

BACKGROUND

In many situations, it is desirable to get "close" to an object without moving physically closer. A zoom control on a camera enables capture of images in which objects in the images can be magnified to obtain closer images of the objects. The zoom control on a camera also enables capture of images using a wide angle of view.

Cameras today often include a zoom lens, which includes a mechanical assembly of lens elements for which a focal length (and thus angle of view) can be varied, as opposed to a fixed focal length (FFL) lens. Using a zoom lens, objects in images can be made to appear larger than actual size. A zoom lens can be used with still images, video, motion picture cameras, projectors, some binoculars, microscopes, telescopes, and other optical instruments.

There are two types of zoom features that are generally used. Optical zoom uses mechanical optics (e.g., lens) of a camera to bring an object closer, for example, by moving the lens farther from an image sensor inside the camera body to increase zoom since a smaller portion of a scene will strike the image sensor, resulting in magnification. In contrast, digital zoom processes captured images to enlarge a portion of an image, and thus, simulate optical zoom. In examples, the camera crops a portion of the image and magnifies a result of the cropping. The magnification process is called interpolation. To make the cropped area bigger, digital zoom makes up, or interpolates, pixels to add to the image, which may give less than satisfactory results. In so doing, image quality can be lost. Using the digital zoom allows magnification of objects while sacrificing image quality to capture the moment.

SUMMARY

This disclosure may disclose, inter alia, methods and systems for modifying a display of a field of view of a robotic device to include zoomed-in and zoomed-out views.

In one example, a method includes receiving information associated with a field of view of a robotic device, and determining a distance of the robotic device to an object in the field of view of the robotic device in which the distance changes over time. The method also includes generating a display of the field of view of the robotic device, and as the distance decreases, modifying the display of the field of view of the robotic device to include a zoomed-in view of the object. The method further includes as the distance increases, modifying the display of the field of view of the robotic device to include a zoomed-out view of the object. An amount of zoom of the object may be inversely proportional to the distance, such that as the distance decreases the zoom increases, and as the distance increases the zoom decreases.

In another example, a non-transitory computer readable medium having stored thereon instructions executable by a computing device to cause the computing device to perform functions is provided. The functions comprise receiving information associated with a field of view of a robotic device, and determining a distance of the robotic device to an object in the field of view of the robotic device in which the distance changes over time. The functions also comprise generating a display of the field of view of the robotic device, and as the distance decreases, modifying the display of the field of view of the robotic device to include a zoomed-in view of the object. The functions further comprise as the distance increases, modifying the display of the field of view of the robotic device to include a zoomed-out view of the object. An amount of zoom of the object may be inversely proportional to the distance, such that as the distance decreases the zoom increases, and as the distance increases the zoom decreases.

In still another example, a device comprising a processor and memory including instructions stored therein executable by the processor to perform functions is provided. The functions comprise receiving information associated with a field of view of a robotic device, and determining a distance of the robotic device to an object in the field of view of the robotic device in which the distance changes over time. The functions also comprise generating a display of the field of view of the robotic device, and as the distance decreases, modifying the display of the field of view of the robotic device to include a zoomed-in view of the object. The functions further comprise as the distance increases, modifying the display of the field of view of the robotic device to include a zoomed-out view of the object. An amount of zoom of the object may be inversely proportional to the distance, such that as the distance decreases the zoom increases, and as the distance increases the zoom decreases.

Any of the methods described herein may be provided in a form of instructions stored on a non-transitory, computer readable medium, that when executed by a computing device, cause the computing device to perform functions of the method. Further examples may also include articles of manufacture including tangible computer-readable media that have computer-readable instructions encoded thereon, and the instructions may comprise instructions to perform functions of the methods described herein.

The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage medium.

In addition, circuitry may be provided that is wired to perform logical functions in any processes or methods described herein.

In still further examples, any type of devices may be used or configured to perform logical functions in any processes or methods described herein.

In yet further examples, any type of devices may be used or configured as means for performing functions of any of the methods described herein (or any portions of the methods described herein).

The foregoing summary is illustrative only and is not intended to be in any way limiting. In addition to the illustrative aspects, embodiments, and features described above, further aspects, embodiments, and features will become apparent by reference to the figures and the following detailed description.

DETAILED DESCRIPTION

In the following detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

This disclosure may disclose, inter alia, methods and systems for modifying a display of a field of view of a robotic device to include zoomed-in and zoomed-out views. In examples, the robotic device may be a stationary device or may be a roaming device that includes a camera or image capture device to capture images in a field of view of a robotic device. The robotic device may include distance sensors which can provide outputs that may be used to determine a distance of the robotic device to an object in the field of view of the robotic device. A display of the field of view of the robotic device can be generated, and as the distance decreases, the display of the field of view of the robotic device can be modified to include a zoomed-in view of the object. Additionally, as the distance increases, the display of the field of view of the robotic device can be modified to include a zoomed-out view of the object. An amount of zoom of the object may be inversely proportional to the distance, such that as the distance decreases the zoom increases, and as the distance increases the zoom decreases.

Figure 1:
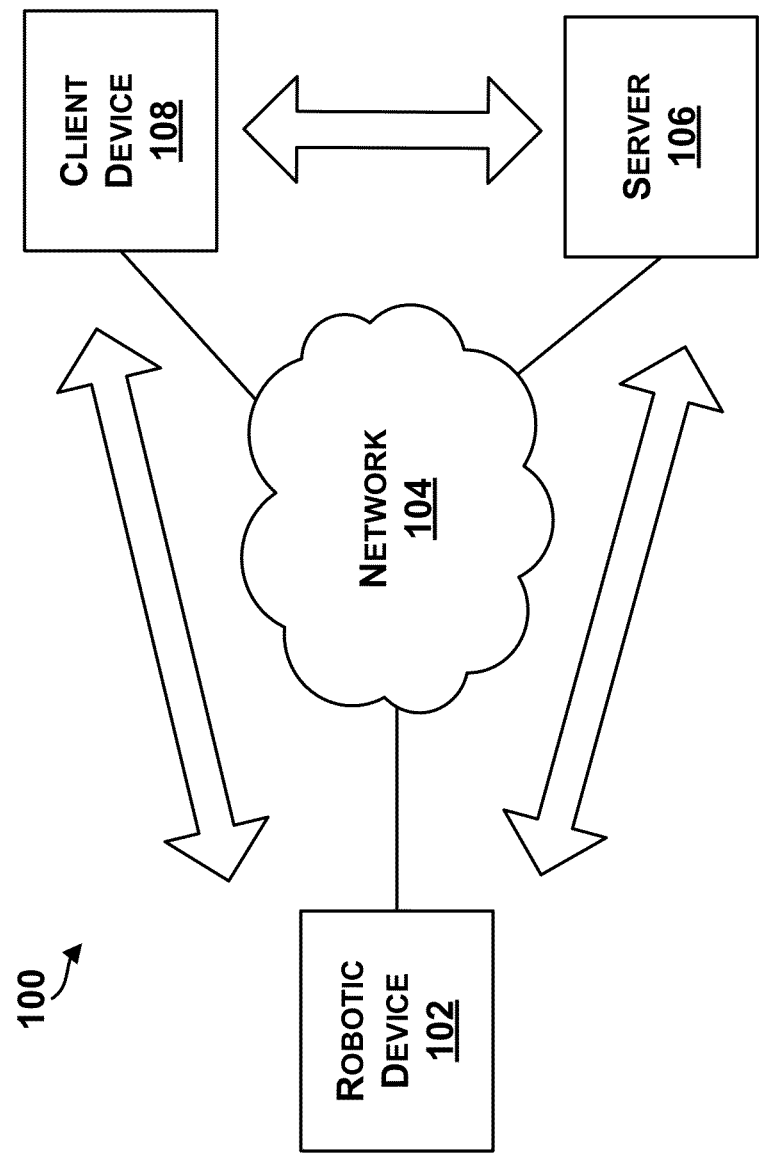
FIG. 1 is an example system for generating and modifying a view of a robotic device.

Referring now to the figures, FIG. 1 is an example system 100 for generating and modifying a view of a robotic device.

The system 100 includes a robotic device 102 coupled to a network 104, and a server 106 and a client device 108 also coupled to the network. The robotic device 102 may further be coupled directly (or indirectly) to the server 106 and the client device 108 as shown. The system 100 may include more of fewer components, and each of the robotic device 102, the server 106, and the client device 108 may comprise multiple elements as well. Thus, one or more of the described functions of the system 100 may be divided up into additional functional or physical components, or combined into fewer functional or physical components. In some further examples, additional functional and/or physical components may be added to the examples illustrated by FIG. 1.

The system 100 may enable cloud-based computing. Cloud-based computing generally refers to networked computer architectures in which application execution and storage may be divided, to some extent, between client and server devices. A "cloud" may refer to a service or a group of services accessible over a network (e.g., Internet) by client and server devices, for example. Cloud-based computing can also refer to distributed computing architectures in which data and program logic for a cloud-based application are shared between one or more client devices and/or server devices on a near real-time basis. Parts of this data and program logic may be dynamically delivered, as needed or otherwise, to various clients accessing the cloud-based application. Details of the architecture may be transparent to users of client devices. Thus, a PC user or robot client device accessing a cloud-based application may not be aware that the PC or robot downloads program logic and/or data from the server devices, or that the PC or robot offloads processing or storage functions to the server devices, for example.

The system 100 includes a number of devices coupled to or configured to be capable of communicating with the network 104. Of course, more or fewer client devices may be coupled to the network 104. In addition, different types of devices may be coupled to the network 104. For example, any of the devices may generally comprise a display system, memory, and a processor.

Any of the devices shown in FIG. 1 may be coupled to the network 104 or to each other using wired or wireless communications. For example, communication links between the network 104 and devices may include wired connections, such as a serial or parallel bus. Communication links may also be wireless links, which may include Bluetooth, IEEE 802.11 (IEEE 802.11 may refer to IEEE 802.11-2007, IEEE 802.11n-2009, or any other IEEE 802.11 revision), or other wireless based communication links. In other examples, the system 100 may include access points through which the devices may communicate with the network 104. Access points may take various forms, for example, an access point may take the form of a wireless access point (WAP) or wireless router. As another example, if a client device connects using a cellular air-interface protocol, such as a CDMA or GSM protocol, an access point may be a base station in a cellular network that provides Internet connectivity via the cellular network.

As such, the robotic device 102, the server 106, and the client device 108 may include a wired or wireless network interface through which the devices can connect to the network 104 (or access points). As an example, the devices may be configured use one or more protocols such as 802.11, 802.16 (WiMAX), LTE, GSM, GPRS, CDMA, EV-DO, and/or HSPDA, among others. Furthermore, the client devices may be configured use multiple wired and/or wireless protocols, such as "3G" or "4G" data connectivity using a cellular communication protocol (e.g., CDMA, GSM, or WiMAX, as well as for "WiFi" connectivity using 802.11). Other examples are also possible.

The network 104 may represent a networked computer architecture, and in one example, the network 104 represents a queue for handling requests from client devices. The network 104 may further include any of a local area network (LAN), wide area network (WAN), wireless network (Wi-Fi), or Internet, for example.

The server 106 may be a component coupled to the network 104 (as shown), or a component of the network 106 depending on a configuration of the system 100. The server 106 may include a processor and memory including instructions executable by the processor to perform functions as described herein.

The client device 108 may include any type of computing device (e.g., PC, laptop computer, etc.), or any type of mobile computing device (e.g., laptop, mobile telephone, cellular telephone, etc.). The client device 108 may include a processor and memory including instructions executable by the processor to perform functions as described herein.

The robotic device 102 may comprise any computing device that may include connection abilities to the network 104 and that has an actuation capability (e.g., electromechanical capabilities). A robotic device may further be a combination of computing devices. In some examples, the robotic device 102 may collect data and upload the data to the network 104. The network 104 may be configured to perform calculations or analysis on the data and return processed data to the robotic device 102.

Any of the client devices may include additional components. For example, the robotic device 102 may include one or more sensors, such as a gyroscope, an accelerometer, or distance sensors to measure movement of the robotic device 102. Other sensors may further include any of Global Positioning System (GPS) receivers, infrared sensors, optical sensors, biosensors, Radio Frequency identification (RFID) systems, wireless sensors, and/or compasses, among others, for example.

In addition, any of the robotic device 102, the server 106, and the client device 108 may include an integrated user-interface (UI) that allows a user to interact with the device. For example, the robotic device 102 may include various buttons and/or a touchscreen interface that allow a user to provide input. As another example, the robotic device 102 may include a microphone configured to receive voice commands from a user. Furthermore, the robotic device 102 may include one or more interfaces that allow various types of user-interface devices to be connected to the robotic device 102.

Figure 2A:
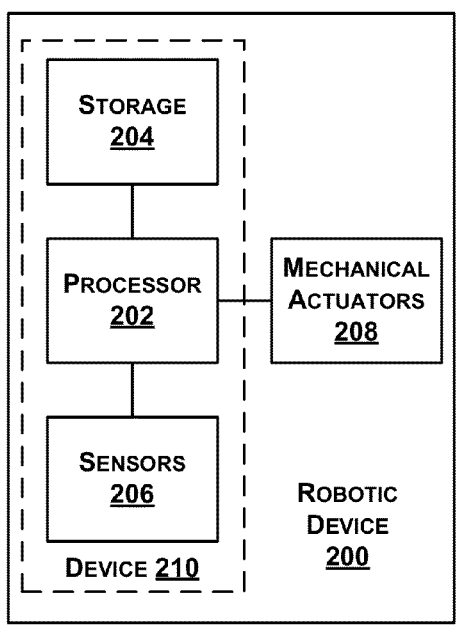
FIG. 2A-2C are example illustrations of robotic devices.

FIG. 2A illustrates an example robotic device 200. In one example, the robotic device 200 is configured as a robot. In some examples, a robot may be contain computer hardware, such as a processor 202, memory or data storage 204, and one or more sensors 206. For example, a robot controller (e.g., processor 202, computing system, and sensors 206) may all be custom designed for a specific robot. The robot may have a link to access cloud servers (as shown in FIG. 1). A wired link may include, for example, a parallel bus or a serial bus such as a Universal Serial Bus (USB). A wireless link may include, for example, Bluetooth, IEEE 802.11, Cellular (such as GSM, CDMA, UMTS, EV-DO, WiMAX, or LTE), or Zigbee, among other possibilities.

In one example, the storage 204 may be used for compiling data from various sensors 206 of the robotic device 200 and storing program instructions. The processor 202 may be coupled to the storage 204 and may be configured to control the robotic device 200 based on the program instructions. The processor 202 may also be able to interpret data from the various sensors 206 on the robot. Example sensors may include a camera, smoke sensors, light sensors, radio sensors, infrared sensors, microphones, speakers, gyroscope, accelerometer, distance sensors, a camera, radar, capacitive sensors and touch sensors, etc. Example distance sensors include infrared ranging sensors, photoelectric distance sensors, proximity sensors, ultrasonic sensors, radar, or other types of sensors that may provide outputs used to determine a distance of the robotic device 200 to an object.

The robotic device 200 may also have components or devices that allow the robotic device 200 to interact with its environment. For example, the robotic device 200 may have a camera to provide images of a field of view of the environment as well as mechanical actuators 208, such as motors, wheels, movable arms, etc., that enable the robotic device 200 to move or interact with the environment.

In some example, various sensors and devices on the robotic device 200 may be modules. Different modules may be added or removed from the robotic device 200 depending on requirements. For example, in a low power situation, a robot may have fewer modules to reduce power usages. However, additional sensors may be added as needed. To increase an amount of data a robot may be able to collect, additional sensors may be added, for example.

In some example, the robotic device 200 may be configured to receive a device, such as device 210, that includes the processor 202, the storage 204, and the sensors 206. For example, the robotic device 200 may be a robot that have a number of mechanical actuators (e.g., a movable base), and the robot may be configured to receive a mobile telephone to function as the "brains" or control components of the robot. The device 210 may be considered a module of the robot. The device 210 may be physically attached to the robot or in communication with the robot. For example, a mobile phone may sit on a robot's "chest" and form an interactive display. The device 210 may provide a robot with sensors, a wireless link, and processing capabilities, for example. The device 210 may allow a user to download new routines for his or her robot from the cloud. For example, a laundry folding routine may be stored on the cloud, and a user may be able to select this routine using a mobile phone to download the routine from the cloud, and when the mobile phone is placed into or coupled to the robot, the robot would be able to perform the downloaded action.

In some examples, the robotic device 200 may be coupled to a mobile or cellular telephone to provide additional sensing capabilities. The cellular phone may not be physically attached to the robot, but may be coupled to the robot wirelessly. For example, a low cost robot may omit a direct connection to the internet. This robot may be able to connect to a user's cellular phone via a wireless technology (e.g., Bluetooth) to be able to access the internet. The robot may be able to access various sensors and communication means of the cellular phone. The robot may not need as many sensors to be physically provided on the robot, however, the robot may be able to keep the same or similar functionality.

Thus, the robotic device 200 may include mechanical robot features, and may be configured to receive the device 210 (e.g., a mobile phone), which can provide additional peripheral components to the robotic device 200, such as any of an accelerometer, gyroscope, compass, GPS, camera, WiFi connection, a touch screen, etc., that are included within the device 210.

Figure 2B:
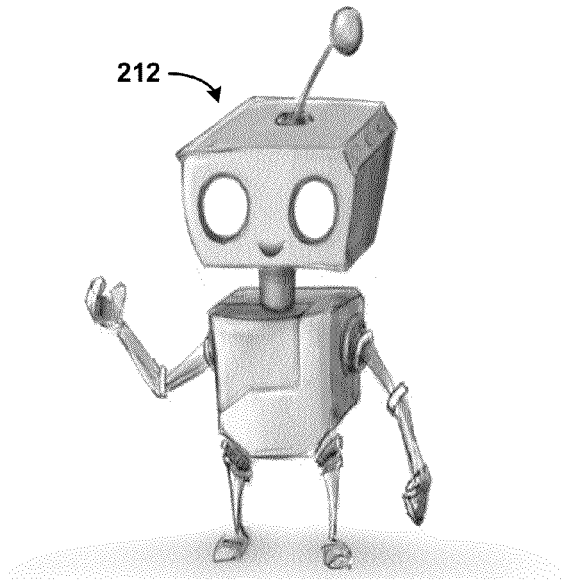

FIG. 2B illustrates a graphical example of a robot 212. In FIG. 2B, the robot 212 is shown as a mechanical form of a person including arms, legs, and a head. The robot 212 may be configured to receive any number of modules or components, such a mobile phone, which may be configured to operate the robot. In this example, a device (e.g., robot 212) can be attached to a mobile phone (e.g., device 210) to provide the mechanical robot 212 with functionality enabling the robot 212 to communicate with the cloud to cause operation/functions of the robot 212. Other types of devices that have connectivity to the Internet can be coupled to robot 212 to provide additional functions on the robot 212. Thus, the device 210 may be separate from the robot 212 and can be attached or coupled to the robot 212.

In one example, the robot 212 may be a toy with only limited mechanical functionality, and by connecting device 210 to the robot 212, the toy robot 212 may now be capable of performing a number of functions with the aid of the device 210 and/or the cloud. In this manner, the robot 212 (or components of a robot) can be attached to a mobile phone to transform the mobile phone into a robot (e.g., with legs/arms) that is connected to a server to cause operation/functions of the robot.

Figure 2C:
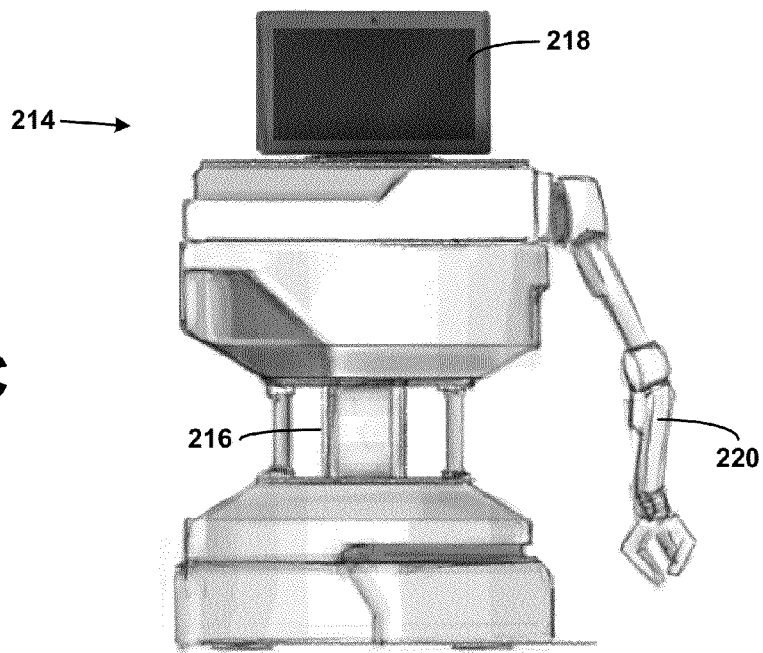

FIG. 2C illustrates another example of a robot 214. The robot 214 includes a computing device 216, sensors 218, and a mechanical actuator 220. In this example, the computing device 216 may be a laptop computer, which may be coupled to the sensors 218. The sensors 218 may include a camera, infrared projectors, and other motion sensing or vision sensing elements. The sensors 218 may be included within a tablet device, which may also function as the computing device 216. The mechanical actuator 220 may include a base, wheels, and a motor upon which the computing device 216 and the sensors 218 can be positioned, for example.

Any of the robots illustrated in FIGS. 2A-2C may be configured to operate according to a robot operating system (e.g., an operating system designed for specific functions of the robot). A robot operating system may provide libraries and tools (e.g., hardware abstraction, device drivers, visualizers, message-passing, package management, etc.) to enable robot applications. Examples of robot operating systems include open source software such as ROS (robot operating system), DROS, or ARCOS (advanced robotics control operating system); proprietary software such as the robotic development platform ESRP from Evolution Robotics® and MRDS (Microsoft® Robotics Developer Studio), and other examples also include ROSJAVA. A robot operating system may include publish and subscribe functionality, and may also include functionality to control components of the robot, such as head tracking, base movement (e.g., velocity control, navigation framework), etc.

Figure 3:
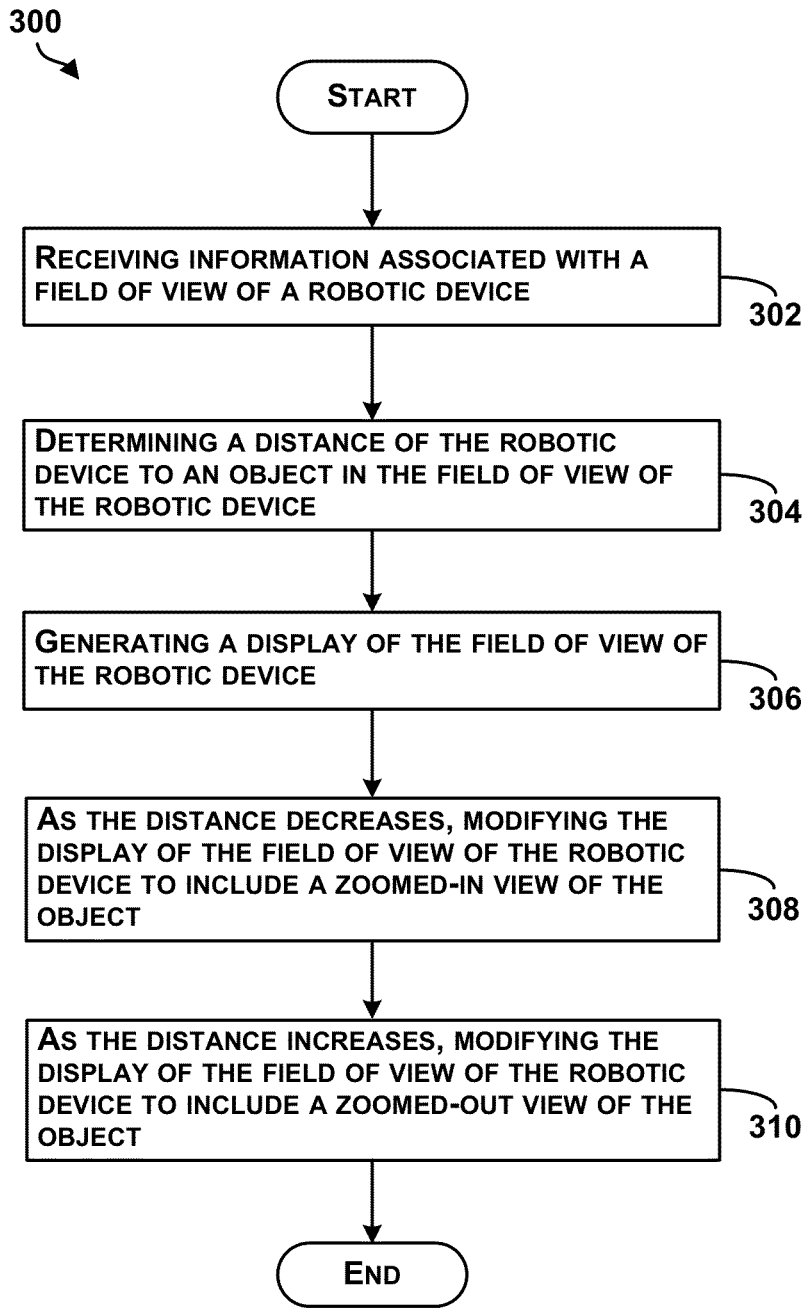
FIG. 3 is a block diagram of an example method of generating and modifying a display of a field of view of a robotic device to include zoomed-in and zoomed-out views.

FIG. 3 is a block diagram of an example method of generating and modifying a display of a field of view of a robotic device to include zoomed-in and zoomed-out views. Method 300 shown in FIG. 3 presents an embodiment of a method that, for example, could be used with the system 100, for example, and may be performed by a device, such as any devices illustrated in FIGS. 1-2, or components of the device. Method 300 may include one or more operations, functions, or actions as illustrated by one or more of blocks 302-310. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

In addition, for the method 300 and other processes and methods disclosed herein, the flowchart shows functionality and operation of one possible implementation of present embodiments. In this regard, each block may represent a module, a segment, or a portion of program code, which includes one or more instructions executable by a processor or computing device for implementing specific logical functions or steps in the process. The program code may be stored on any type of computer readable medium, for example, such as a storage device including a disk or hard drive. The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device.

In addition, for the method 300 and other processes and methods disclosed herein, each block in FIG. 3 may represent circuitry that is wired to perform the specific logical functions in the process.

At block 302, the method 300 includes receiving information associated with a field of view of a robotic device. In one example, the robotic device includes a camera or other image capture device that captures images from a perspective of a field of view of the robotic device. The image capture device may provide information associated with the field of view including the images to a processor of the robotic device, which may receive the information. In another example, the robotic device may provide the information associated with the field of view of the robotic device to a server, which may receive the information. In still another example, the robotic device may provide the information associated with the field of view of the robotic device to a user device, which may receive the information. Thus, any number of devices or servers, including the robotic device itself, may receive the information associated with the field of view of the robotic device.

At block 304, the method 300 includes determining a distance of the robotic device to an object in the field of view of the robotic device. In one example, a robotic device includes sensors that may make measurements or provide outputs that can be used to determine/estimate a distance of the robotic device to an object in the field of view of the robotic device. The distance may be determined and provided to one or more devices. For instance, to determine the distance, the robotic device, a server, or a user device may receive information indicating the distance, such that the distance was pre-calculated and provided to one or more of the devices.

In examples, the robotic device may be stationary, and objects may move within and out of the field of view of the robotic device, or the robotic device may be movable as well. Thus, the distance of the robotic device to objects in the field of view may change over time. The robotic device may be configured to determine a distance to any or all objects as the robotic device approaches an object or as an object approaches the robotic device. In other examples, the robotic device may determine distances to objects once the objects are within a threshold distance, such as within about 5 feet to 10 feet to the robotic device.

At block 306, the method 300 includes generating a display of the field of view of the robotic device. For example, any of the robotic device, server, or user device may generate a display of the field of view of the robotic device. The display may be provided to any other device, or to a display device to be displayed.

At block 308, the method 300 includes as the distance decreases, modifying the display of the field of view of the robotic device to include a zoomed-in view of the object. For example, the display can be modified such that as the robotic device approaches an object, the display of the object itself may be magnified. In other examples, display of other items in the display may remain proportional sizes, such that the display is generally focused on the object.

In examples, the robotic device, the server, or the user device may continually receive distance measurements indicating distances of the robotic device to the object, and may determine that the distance to a given object is decreasing. Once the determination is made that the distance is decreasing, the display may be modified to provide the zoomed-in view of the object. Alternatively, the display may be modified once the distance has decreased a threshold amount, in which case it may be determined that the robotic device is within a certain distance to the object (e.g., about 5 feet to 40 feet).

The display may be modified in a number of ways. For example, the robotic device may make the determination that the distance has decreased, and may itself adjust a zoom lens of a camera on the robotic device that is used to capture images of the field of view. Alternatively, a server or a user device may make the determination that the distance has decreased and may provide instructions to the robotic device indicating to adjust the zoom lens accordingly.

Still further, any of the robotic device, the server, or a user device may modify the display by digitally adjusting a zoom of the display of the field of view of the robotic device based on the distance. In this manner, the display can be modified using digital zoom techniques to process captured images to enlarge a portion of an image, and thus, simulate optical zoom.

In further examples, the display may be modified in other ways as well. For instance, a focal depth of the camera on the robotic device may be altered to control a placement of an image plane in relation to the lens of the camera (e.g., to control distances in space for which object points are imaged). The display may be then modified based on the focal depth of the camera to provide a zoomed-in view of an object as the robotic device approaches the object. Similarly, the display can be modified based on the focal depth of the camera to provide a zoomed-out view of an object as the robotic device moves away from the object.

In still further examples, the robotic device may include more than one camera, and the display may be modified to provide images of from the multiple cameras, such as images of multi-camera convergence. As an example, multiple cameras on the robotic device may be focused on an object in a narrow depth of field to provide a stereo image with convergence on an area of interest (e.g., the object). Thus, as the robotic device approaches an object, multiple cameras on the robotic device may each focus on the object resulting in a stereo image that may be displayed in the zoomed-in view. Each camera may provide a zoomed-in view of the object to generate the zoomed-in stereo display. Alternatively, images or video from each camera may be processed to generate the zoomed-in stereo display.

At block 310, the method 300 includes as the distance increases, modifying the display of the field of view of the robotic device to include a zoomed-out view of the object. Once the determination is made that the distance is increasing, the display may be modified to provide the zoomed-out view of the object. Alternatively, the display may be modified once the distance has increased a threshold amount, in which case it may be determined that the robotic device is a certain distance away from the object (e.g., about 10 feet to 50 feet).

In some examples, as described in the method 300, the display of the field of view of the robotic device may be modified to include a zoomed-in view or a zoomed-out view of the object as the distance of the robotic device to the object decreases or increases. In other examples, other methods include magnifying or zooming-in at least a portion of a display associated with a remotely operated robotic device based upon a determination of a distance from the robotic device to at least one object proximate to the robotic device. Thus, methods can be provided for zooming-in views as the robotic device approaches objects, and alternate methods can be provided for zooming-out views as the robotic device travels away from objects. Still alternate methods can be provided to have both functions of zooming-in and zooming-out views.

In the method 300, an amount of zoom of the object may be inversely proportional to the distance, such that as the distance decreases the zoom increases, and as the distance increases the zoom decreases. In this manner, when the robotic device is closer to the object, a display of the object can be magnified, and when the robotic device is farther away from the object, the display of the object may return to a proportional size.

The method 300 may further include determining a zoom level of the field of view of the robotic device based on the distance, and the display can be generated to depict the object according to the zoom level. The zoom level may be indicative of a size at which to depict the object. For example, zoom levels may be preset according to distances to objects. Example zoom levels (e.g., corresponding to distances to objects are provided below in the table.

TABLE 1

| Distance to Object | Zoom Level |
|---|---|
| 5 feet | 5 x |
| 20 feet | 4 x |
| 40 feet | 3 x |
| 100 feet | 1 x |

As described, the zoom level may also be based on a speed of the robotic device, and example zoom levels based on speed and distance are provided below in Table 2.

TABLE 2

| Distance to Object | Zoom Level | Speed of Robotic Device |
|---|---|---|
| 5 feet | 7 x | 5 MPH |
| 20 feet | 6 x | 10 MPH |
| 40 feet | 5 x | 25 MPH |
| 100 feet | 4 x | 50 MPH |

Still further, zoom levels may be based on a size of the object. For example, the robotic device may include sensors that can provide outputs used to interpret or estimate a size of the object. Still further, the robotic device may include sensors that can provide outputs used to perform an object recognition of the object (e.g., images of objects can be used to identify the objects). An object recognition process may return information associated with the object, such as a size of the object. Based on the size of the object, the display of the object can be modified accordingly. For example, for smaller objects, the display of the object may be magnified to a larger extent than for larger objects.

In some examples, the display of the field of view of the robotic device may be generated and/or modified based on the speed of the robotic device. For instance, if the robotic device is moving slowly, and approaches objects slowly, then the display of the objects can be modified to magnify the objects once the robotic device is about 5 feet to 10 feet within the object. This may enable a user or operator of the robotic device to visualize the object as the robotic device approaches the object. In another instance, if the robotic device is moving fast, and approaches objects fast, then the display of objects can be modified to magnify the objects once the robotic device is about 40 feet to 50 feet within the object. This many enable the user or operator of the robotic device to visualize the object and provide enough time to make adjustments or maneuver around the object.

In some examples, the display of the field of view of the robotic device includes a streaming display, such as a live or substantially live video feed from the robotic device. As the distance of the robotic device to the object decreases (e.g., the robotic device moves closer to the object), a gradual increase to a size of the object in the display can be determined such that the gradual increase is proportional to a speed of the robotic device. In this manner, a streaming display of the field of view of the robotic device can be generated including the gradual increase to the size of the object.

In still other examples, the display of the field of view of the robotic device may be modified to provide a gradual increase/decrease to a size of the object in the display based on a speed of movement of the robotic device. The gradual increase/decrease may be proportional to the speed of the robotic device.

The zoom level may be configured such that the size of the object is magnified to be about 50% to 65% of the display, and the magnification may be dependent upon any number of factors including distance to the object, speed of the robotic device, size of the object, etc.

The method 300 may be implemented to generate a display for a user interface, such as a graphical user interface (GUI), which may be configured to monitor or enable control of the robotic device. For example, a user device may include the GUI, and the user device may be located remotely from the robotic device. The user device may be configured to allow remote operation of the robotic device. The GUI may include other information or enable other controls of the robotic device. For example, the GUI may include the display of the field of view of the robotic device and control icons operable to control functions of the robotic device.

Figure 4:
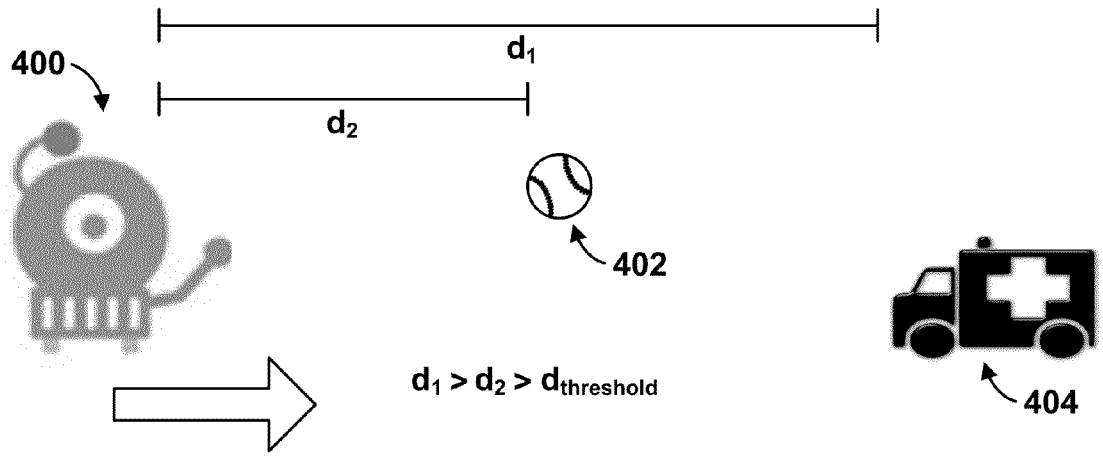
FIG. 4 is an example conceptual illustration of a robotic device in an environment including objects.

FIG. 4 is an example conceptual illustration of a robotic device 400 in an environment including objects, such as a baseball 402 and a toy truck 404. Initially, the robotic device 400 is a distance $d_1$ from the toy truck 404 and $d_2$ from the baseball. In this example, $d_1 > d_2 > d_{threshold}$, where $d_{threshold}$ is a distance at which a size of an object in a display may be magnified to provide a zoomed-in view. As the robotic device 400 approaches the objects, the distances $d_1$ and $d_2$ will decrease.

Figure 5A:
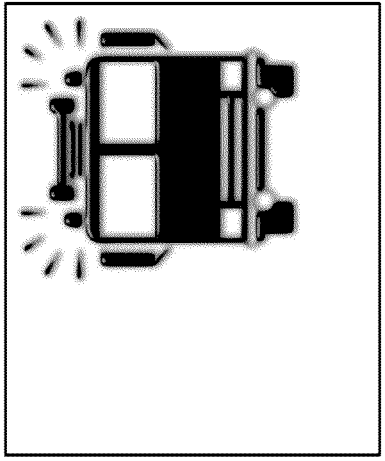
FIGS. 5A-5C are example illustrations of displays of the field of view of the robotic device according to the configuration in FIG. 4.
Figure 5B:
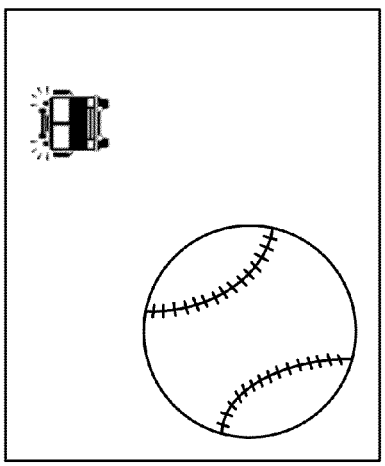
Figure 5C:
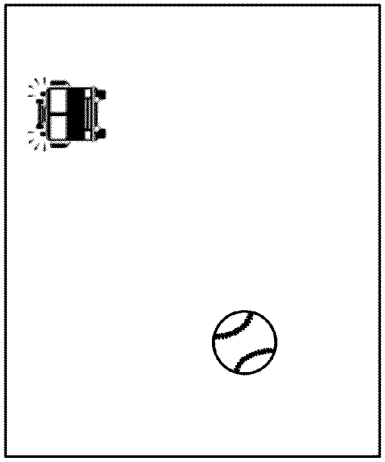

FIGS. 5A-5C are example illustrations of displays of the field of view of the robotic device 400 according to the configuration in FIG. 4. The displays may be configured to be provided in a graphical user interface (GUI), for example.

In FIG. 5A, $d_1 > d_2 > d_{threshold}$, and thus, a display of the objects may be proportional to an actual display from a perspective of the robotic device 400 with no magnification of the objects.

In FIG. 5B, $d_1 > d_{threshold} > d_2$, and in this example, the robotic device 400 has moved forward closer to the objects. The distance has decreased to both objects, however, the display may be modified to only magnify the baseball 402 since the distance to the baseball is less than the threshold distance. Thus, in FIG. 5B, the display of the baseball 402 is magnified to be a zoomed-in view of the baseball 402. A user or operator of the robotic device that has access to the GUI may then visualize the baseball 402 more clearly to enable operations to be performed on the object or to maneuver around the object.

In FIG. 5C, $d_{threshold} > d_1$, and in this example, the robotic device 400 has moved past the baseball 402, and thus, the baseball 402 is no longer in a field of view of the robotic device 400. However, the robotic device 400 has moved closer to the toy truck 404 such that the distance to the toy truck 404 is now less than the threshold distance. The display of the toy truck 404 may be magnified to provide a zoomed-in view of the toy truck 404.

Figure 6:
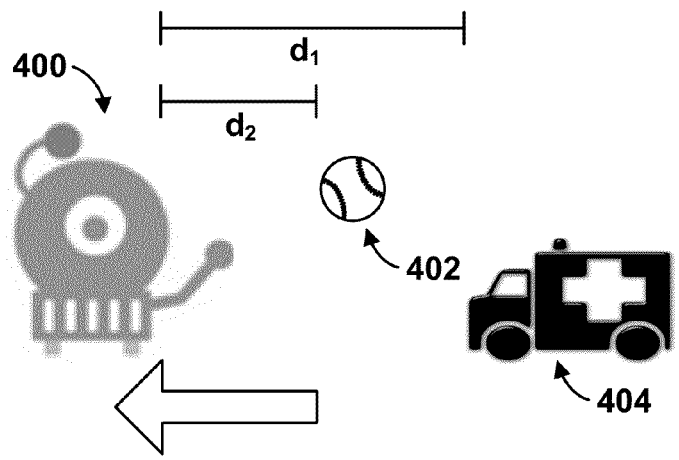
FIG. 6 is another example conceptual illustration of the robotic device in an environment including objects.

FIG. 6 is another example conceptual illustration of the robotic device 400 in an environment including objects, such as the baseball 402 and the toy truck 404. In this illustration, the robotic device 400 is a distance $d_1$ from the toy truck 404 and $d_2$ from the baseball, and the robotic device 400 is moving away from the objects.

Figure 7C:
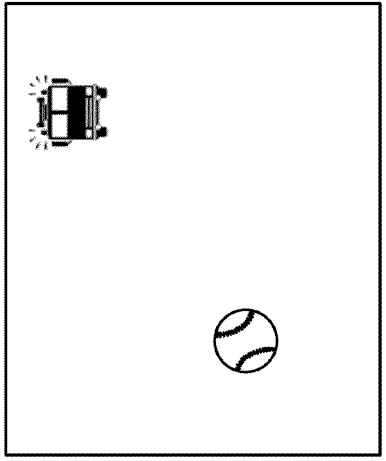
FIGS. 7A-7C are example illustrations of displays of the field of view of the robotic device according to the configuration in FIG. 6.
Figure 7B:
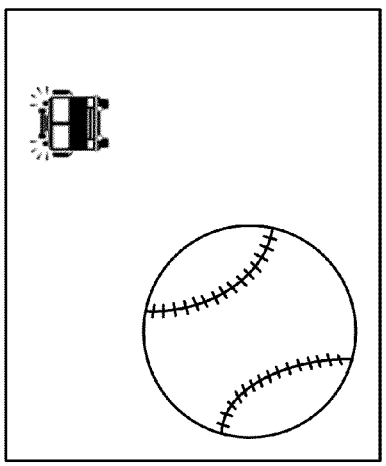
Figure 7A:
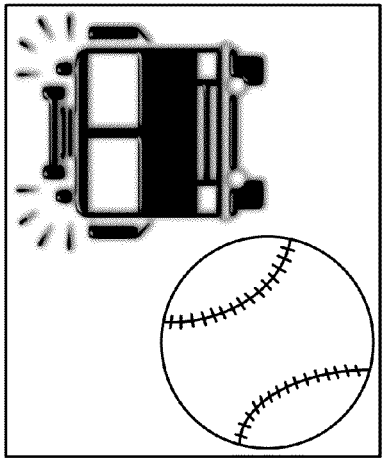

FIGS. 7A-7C are example illustrations of displays of the field of view of the robotic device 400 according to the configuration in FIG. 6. The displays may be configured to be provided in a graphical user interface (GUI), for example.

In FIG. 7A, $d_{threshold} > d_1 > d_2$, and thus, a display of one or more of the objects may be magnified as shown. As the robotic device 400 moves away from the objects, the distance to the objects increases. As shown in FIG. 7B, $d_1 > d_{threshold} > d_2$, and thus, the display of the toy truck 404 is modified to provide a zoomed-out view of the toy truck 404. The display of the baseball 402 remains magnified in this example. As shown in FIG. 7C, $d_1 > d_2 > d_{threshold}$, and thus, the display of the baseball 402 is modified to provide a zoomed-out view of the baseball 402.

Figure 8A:
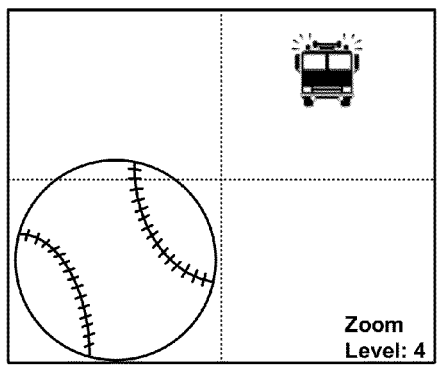
FIGS. 8A-8B are example illustrations of graphical user interfaces (GUIs) showing displays of a field of view of the robotic device.
Figure 8B:
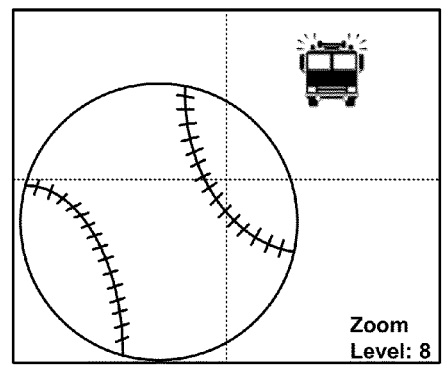

FIGS. 8A-8B are example illustrations of graphical user interfaces (GUIs) showing displays of a field of view of the robotic device. In FIG. 8A, the display is modified such that the display of the baseball is magnified. In this example, the magnification may be such that the baseball consumes about 25% of a display screen. The display further includes a scale marker that indicates a zoom level of the display of the object in the field of view (e.g., zoom level 4). In FIG. 8B, the display is alternatively modified such that the display of the baseball is magnified to be about 50% of the display screen (e.g., zoom level 8). An amount of magnification may be based on the distance to the object, such that as the distance decreases and the robotic device moves closer to the object, the magnification of the object may be increased further. As an example, the magnification may start at 2× and increase to 5× as the distance decreases.

In some examples, a display of the field of view of the robotic device may be modified to include the zoomed-in view of the object based on an environment in which the robotic device resides. For example, when the robotic device is in an environment including a number of objects more than a threshold number (e.g., about 50 objects), the display of the field of view may then be modified accordingly. However, when the robotic device is in an environment including a number of objects less than a threshold number (e.g., about 10 objects), the display of the field of view may then be modified accordingly. Modification of the display may be further based on a distance of the robotic device to the object.

Figure 9:
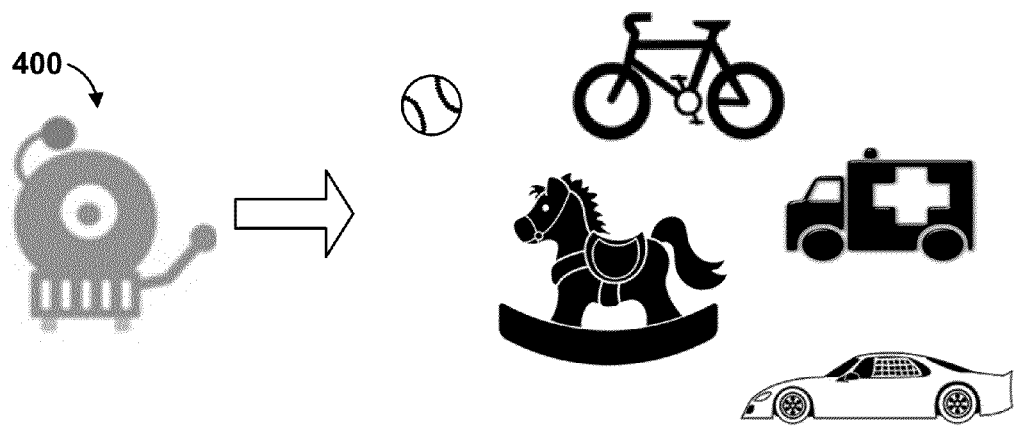
FIG. 9 is another example conceptual illustration of the robotic device in an environment including objects, such as a baseball and a toy horse, a toy bicycle, a toy truck, and a toy car.

FIG. 9 is another example conceptual illustration of the robotic device 400 in an environment including objects, such as a baseball and a toy horse, a toy bicycle, a toy truck, and a toy car. In this example, it may be determined that a number of objects are within the field of view of the robotic device, and distances of the robotic device to at least some of the number of objects in the field of view of the robotic device can also be determined. The robotic device, server, or a user device may make the determinations. Based on the distances of the robotic device to the at least some of the number of objects and/or based on the number of objects, the display of the field of view of the robotic device may be modified to include zoomed-in views of the at least some of the number of objects. In this example, it can be determined that the robotic device 400 is in a cluttered area, and a zoomed-in view may enable an operator a better view of the area.

In still further examples, the display of the field of view may be modified based on other information. For example, it may be determined that the field of view includes information associated with a given object that corresponds to predefined information. The predefined information may include information associated with one or more of an obstacle, a geographic location, a position of the robotic device, a predefined object, a person, and a recognized person, for example. Once a predefined information is determined, the display of the field of view of the robotic device may be responsively generated to include a zoomed-in view of the given object.

As a specific example, object recognition can be performed on objects within the field of view of the robotic device, and once an object is identified that has been flagged, the display of the object may be magnified. Any objects may be flagged within a database. Objects may further include specific people, such that object recognition may include face recognition, and when the display of the field of view of the robotic device includes a specific person that has been flagged, the display can be modified to provide a zoomed-in view of the specific person.

Object recognition or face recognition may be performed by the robotic device, a server in communication with the robotic device, or a user device in communication with the robotic device. In one example, the robotic device may provide images of the field of view to a server and may request information about the images, such as an identity of objects in the image or information associated with characteristics of objects in the image. The server may then perform object recognition techniques to determine the requested information.

As an additional or alternative method for performing object recognition, objects may be tagged with a type of identifier (e.g., radio frequency identification (RFID) chip, near field communication chip (NFC), bar code, etc.), so that a robotic device, server, or user device may include an application enabling identification of the object based on the identifier. The identifier may provide information about the object including an identification, details of the object (mass, color, type, brand, etc.), a location of the object, etc. In some examples, objects may emit beacons that can be received by the robots to determine existence/identification/location of the object. In this example, a physical environment may be instrumented with beacons in forms of NFC, RFID, QR codes, etc. to enable a robot to localize and identify objects. Beacons may be stationary beacons or moving beacons (RFID in an employee's ID badge) to perform tracking of objects.

It should be understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

What is claimed is:

1. A method comprising:
    determining a distance of a moving robotic device to an object in a field of view of the robotic device, wherein the distance changes over time as the robotic device is in motion;
    determining a speed of movement of the robotic device;
    as the distance to the object in the field of view decreases, determining a modified field of view of the robotic device that includes a zoomed-in view of the object based on the distance to the object in the field of view and further based on the speed of movement of the robotic device; and
    as the distance to the object in the field of view increases, determining a modified field of view of the robotic device that includes a zoomed-out view of the object based on the distance to the object in the field of view and further based on the speed of movement of the robotic device.

2. The method of claim 1, further comprising:
    generating a display of the field of view of the robotic device, wherein the display of the field of view of the robotic device includes a streaming display;
    determining that the robotic device is moving closer to the object;
    determining a gradual increase to a size of the object in the display, wherein the gradual increase is proportional to a speed of movement of the robotic device; and
    generating the streaming display of the field of view of the robotic device including the gradual increase to the size of the object.

3. The method of claim 1, further comprising:
    determining a zoom level of the field of view of the robotic device based on the distance; and
    generating a display of the field of view of the robotic device to depict the object according to the zoom level, wherein the zoom level is indicative of a size at which to depict the object.

4. The method of claim 3, wherein determining the zoom level of the field of view of the robotic device comprises determining the zoom level to be configured such that the size of the object is about 50% to 65% of the display.

5. The method of claim 1, further comprising:
    making a determination whether to generate a display of the field of view of the robotic device to include the zoomed-in view of the object based on an environment in which the robotic device resides;
    based on the determination, generating the display of the field of view of the robotic device.

6. The method of claim 1, further comprising:
    determining that a number of objects are within the field of view of the robotic device, wherein the number of objects is over a threshold number; and
    when the distance of the robotic device to the object is less than a threshold distance and the number of objects is over the threshold number, determining a modified field of view of the robotic device to include the zoomed-in view of the object.

7. The method of claim 1, further comprising:
   determining that a number of objects are within the field of view of the robotic device;
   determining distances of the robotic device to at least some of the number of objects in the field of view of the robotic device; and
   based on the distances of the robotic device to the at least some of the number of objects, determining a modified field of view of the robotic device to include zoomed-in views of the at least some of the number of objects.

8. The method of claim 1, wherein determining the distance of the robotic device to the object in the field of view of the robotic device comprises receiving information associated with outputs from distance sensors positioned on the robotic device.

9. The method of claim 1, wherein the method is performed by the robotic device.

10. The method of claim 1, wherein the method is performed by a server.

11. The method of claim 1, further comprising:
    generating a display of the field of view of the robotic device; and
    providing the display to a graphical user interface on a device positioned remotely from the robotic device.

12. The method of claim 11, further comprising providing in the display a scale marker that is indicative of a zoom level of the display of the object in the field of view.

13. The method of claim 1, further comprising determining that the distance has decreased a threshold amount, and then determining a modified field of view of the robotic device that includes a zoomed-in view of the object.

14. The method of claim 1, further comprising:
    generating a display of the field of view of the robotic device; and
    digitally adjusting a zoom of the display of the field of view of the robotic device based on the distance.

15. The method of claim 1, further comprising:
    determining that the field of view includes information associated with a given object that corresponds to predefined information, wherein the predefined information includes information associated with one or more of an obstacle, a geographic location, a position of the robotic device, a predefined object, a person, and a recognized person; and
    responsively determining a modified field of view of the robotic device to include a zoomed-in view of the given object.

16. A non-transitory computer readable medium having stored thereon instructions executable by a computing device to cause the computing device to perform functions comprising:
    determining a distance of a moving robotic device to an object in a field of view of the robotic device, wherein the distance changes over time as the robotic device is in motion;
    determining a speed of movement of the robotic device;
    as the distance to the object in the field of view decreases, determining a modified field of view of the robotic device that includes a zoomed-in view of the object based on the distance to the object in the field of view and further based on the speed of movement of the robotic device; and
    as the distance to the object in the field of view increases, determining a modified field of view of the robotic device that includes a zoomed-out view of the object based on the distance to the object in the field of view and further based on the speed of movement of the robotic device.

17. The non-transitory computer readable medium of claim 16, further comprising instructions executable by the computing device to cause the computing device to perform functions comprising:
    generating a display of the field of view of the robotic device;
    providing the display to a graphical user interface on a device positioned remotely from the robotic device, wherein the graphical user interface includes control icons operable to control functions of the robotic device; and
    providing in the display a scale marker that is indicative of a zoom level of the display of the object in the field of view.

18. A device comprising:
    a processor; and
    memory including instructions stored therein executable by the processor to perform functions comprising:
    determining a distance of a moving robotic device to an object in a field of view of the robotic device, wherein the distance changes over time as the robotic device is in motion,
    determining a speed of movement of the robotic device,
    as the distance to the object in the field of view decreases, determining a modified field of view of the robotic device that includes a zoomed-in view of the object based on the distance to the object in the field of view and further based on the speed of movement of the robotic device, and
    as the distance to the object in the field of view increases, determining a modified field of view of the robotic device that includes a zoomed-out view of the object based on the distance to the object in the field of view and further based on the speed of movement of the robotic device.

19. The device of claim 18, wherein the instructions are further executable by the processor to perform functions comprising:
    generating a display of the field of view of the robotic device, wherein the display includes a streaming display;
    based on the speed of movement of the robotic device, determining a gradual increase to a size of the object in the display, wherein the gradual increase is proportional to the speed of movement of the robotic device; and
    generating the streaming display of the field of view of the robotic device including the gradual increase to the size of the object.

20. The device of claim 18, wherein an amount of zoom of the object is inversely proportional to the distance, such that as the distance decreases the zoom increases, and as the distance increases the zoom decreases.

* * * * *